(12) United States Patent
Ramakrishnan et al.

(10) Patent No.: US 10,866,870 B2
(45) Date of Patent: Dec. 15, 2020

(54) DATA STORE AND STATE INFORMATION HANDOVER

(71) Applicant: HEWLETT PACKARD ENTERPRISE DEVELOPMENT LP, Houston, TX (US)

(72) Inventors: Ashok Ramakrishnan, Durham, NC (US); Paul Cerqua, Westborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 72 days.

(21) Appl. No.: 16/263,199

(22) Filed: Jan. 31, 2019

(65) Prior Publication Data
US 2020/0250056 A1 Aug. 6, 2020

(51) Int. Cl.
*G06F 11/20* (2006.01)
*G06F 9/455* (2018.01)

(52) U.S. Cl.
CPC ...... *G06F 11/2092* (2013.01); *G06F 9/45558* (2013.01); *G06F 11/2023* (2013.01); *G06F 2009/45583* (2013.01); *G06F 2009/45595* (2013.01); *G06F 2201/85* (2013.01)

(58) Field of Classification Search
CPC ............ G06F 11/2023; G06F 11/2092; G06F 9/45558
See application file for complete search history.

(56) References Cited

U.S. PATENT DOCUMENTS

| | | | |
|---|---|---|---|
| 8,010,514 B2 | 8/2011 | Zhang et al. | |
| 8,631,277 B2 | 1/2014 | Swan et al. | |
| 8,856,582 B2 | 10/2014 | George et al. | |
| 9,325,790 B1 | 4/2016 | Le et al. | |
| 9,424,117 B1 * | 8/2016 | Bono | G06F 3/06 |
| 9,600,315 B2 | 3/2017 | Srinivasan et al. | |
| 10,554,685 B1 * | 2/2020 | McArdle | G06F 9/45558 |

(Continued)

OTHER PUBLICATIONS

Clausjor, "SMB Transparent Failover—making file shares continuously available", available online at <https://blogs.technet.microsoft.com/clausjor/2012/06/07/smb-transparent-failover-making-file-shares-continuously-available/>, Jun. 7, 2012, 13 pages.

(Continued)

*Primary Examiner* — Yolanda L Wilson
(74) *Attorney, Agent, or Firm* — Hewlett Packard Enterprise Patent Department (57) ABSTRACT

Each server device of a plurality of server devices may perform a method that includes detecting, by a second server device, that a first storage access virtual machine (SAVM) operating on a first server device has failed, the first SAVM managing access to a first data store of a shared file system by a first client operating on the first server device using a first storage address. The method also includes directing a second SAVM operating on the second server device to manage access to the first data store and granting the second SAVM access to a first state information file stored within the shared file system, the first state information file being associated with the first storage address. The method can also include restoring to the first SAVM, when it becomes operational, management of access to the first data store and access to the first state information file.

19 Claims, 5 Drawing Sheets

(56) References Cited

U.S. PATENT DOCUMENTS

| | | | |
|---|---|---|---|
| 2008/0201458 A1* | 8/2008 | Salli | H04L 61/2038 709/223 |
| 2013/0275808 A1* | 10/2013 | McNeeney | H04L 41/0663 714/20 |
| 2013/0290771 A1* | 10/2013 | Kim | G06F 11/2023 714/3 |
| 2016/0283335 A1* | 9/2016 | Yao | G06F 11/203 |
| 2016/0292053 A1* | 10/2016 | Antony | G06F 11/2038 |
| 2018/0095845 A1* | 4/2018 | Sanakkayala | G06F 11/3495 |
| 2018/0165166 A1* | 6/2018 | Wang | G06F 11/203 |

OTHER PUBLICATIONS

JeffKoch et al., "Virtualizing Your Data Center with Hyper-V and System Center", available online at <https://channe19.msdn.com/Series/Virtualizing-Your-Data-Center-with-Hyper-V-and-System-Center>, Mar. 1, 2014, 5 pages.

Jeremy Allison, "The Evolution of I/O in Samba", available online at <https://web.archive.org/web/20180117041336/https://www.snia.org/sites/default/orig/SDC2012/presentations/Revisions/JeremyAllison_The_Evolution_of_Samba-ion.pdf>, Jan. 17, 2018, 31 pages.

Arjunnagaraju, "Isilon Smartconnect Timeouts," Aug. 18, 2017, pp. 1-2 (online), EMC Corporation, Retrieved from the Internet on Oct. 10, 2018 at URL: <community.emc.com/thread/240865?start=0&tstart=0>.

* cited by examiner

DATA STORE AND STATE INFORMATION HANDOVER

BACKGROUND

Data centers have moved toward being virtualized, such that large amounts of server equipment can be realized as virtual machines on a single server device. Additionally, these virtualized data centers are expected to reliably store data and make certain data, such as data used to keep the virtual machines alive, continuously available. The need for reliable and continuously available data has led to various options of provisioning of groups of server devices that share storage resources such that if one server device in a group fails, another server device in the group can quickly take over storage access responsibilities of the failed server device.

BRIEF DESCRIPTION OF THE DRAWINGS

Features of the present disclosure are illustrated by way of example and not limited in the following figures, in which like numerals indicate like elements, in which.

DETAILED DESCRIPTION

Disclosed herein are methods and systems for data store and state information handover between a plurality of server devices. An example system can include the plurality of server devices and a shared file system that contains data stores for each server device, which are accessible to all the server devices in the plurality of server devices. Each server device includes a client, for instance a hypervisor client that operates one or more guest virtual machines, a storage access virtual machine (SAVM), and physical storage that realizes a portion of the shared file system. Each server device can have a processor and a non-transitory computer-readable storage medium that includes executable instructions, that when executed by the processor, cause the processor to perform one or more methods according to the present disclosure.

One example method can include detecting, by a second server device, that a first SAVM operating on a first server device has failed, the first SAVM managing access to a first data store of the shared file system by a first client operating on the first server device using a first storage address. The method can also include directing a second SAVM operating on the second server device to manage access to the first data store, the second SAVM also managing access to a second data store of the shared file system by a second client operating on the second server device using a second storage address. The method can further include granting the second SAVM access to a first state information file stored within the shared file system, the first state information file being associated with the first storage address. The first state information file can contain state information that allows storage access sessions (or simply "sessions") of the failed first SAVM to be resumed by the second SAVM.

Storing state information files in the same shared file system as the data stores and linking each state information file to the storage address of the corresponding data store allows a quickly accessible pathway to the state information file by any server device of the plurality of server devices to resume ongoing sessions of a failed server device. Where the server devices include hypervisors, sessions can be resumed in well under a time to keep virtual machines from crashing, which are operating on a server device with a failed SAVM. Additionally, having a shared file system that can be distributed between and provide access, to all the server devices in a plurality of server devices, to all the data stores and the state information files provides for a scalable solution for high availability (HA) and continuous availability (CA) data storage. Moreover, examples of the present disclosure are easily incorporated into systems that utilize versions, implementations, or dialects of Server Message Block (SMB) protocol for accessing data stored in the shared file system.

Figure 1:
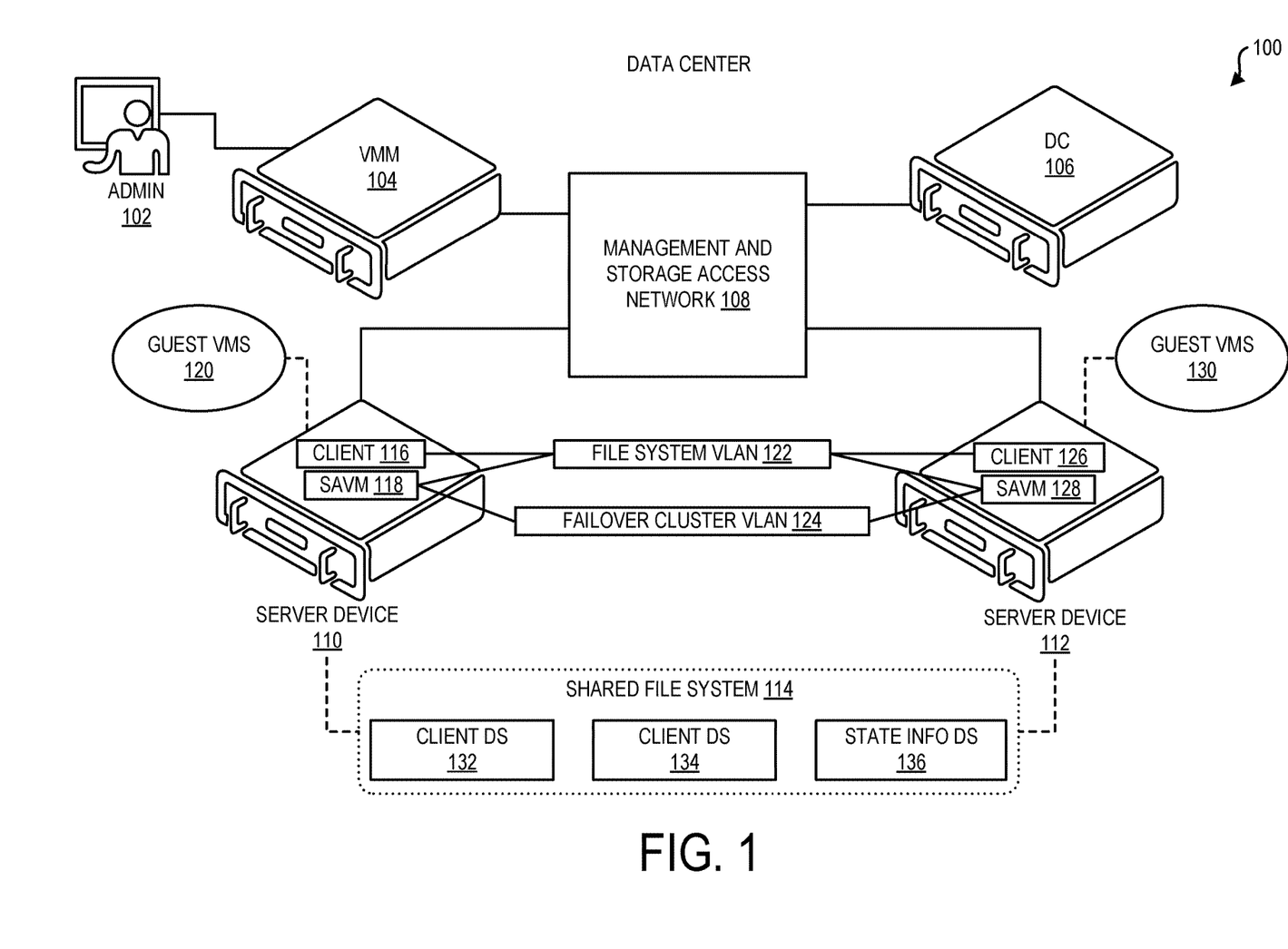
FIG. 1 depicts a data center within which can be implemented data store and state information handover between a plurality of server devices, according to one or more examples of the present disclosure.

FIG. 1 depicts a data center 100 within which can be implemented data store and state information handover between a plurality of server devices 110, 112, according to one or more examples of the present disclosure. For example, the data center 100 is a virtualized data center that includes one or more physical servers, each operating a plurality of virtualized servers thereon. The data center 100 can be used, for instance, to provide access to storage, networking, and other infrastructure and equipment in a cloud-computing environment. As illustrated in FIG. 1, data center 100 includes a virtual machine manager (VMM) 104, for example a System Center Virtual Machine Manager, e.g., SCVMM™, a trademark of Microsoft Corporation, a domain controller (DC) 106, the server devices 110, 112, and a shared file system 114 accessible by the server devices 110, 112. An administrator 102 can interface with the data center 100 via the VMM 104 to provision the data center 100. Only two server devices 110, 112 are shown. However, the data center 100 can contain additional server devices. Moreover, additional equipment, not shown, may be included in the data center 100 such as networking equipment and switches.

In this example, the VMM 104 and the DC 106 are part of a management network that enables the establishment and provisioning of a failover cluster (also referred to herein as a failover domain) that includes the server devices 110, 112, mapping to data stores of the shared file system 114, guest virtual machines (VMs) 120 and 130 (e.g., virtual servers) operating on the server devices 110, 112, authentication, etc. The VMM 104 and the DC 106 communicate with each other and with the server devices 110, 112 over a network 108. For example, the network 108 can be used to exchange management network and storage access messaging or traffic between two or more of the VMM 104, the DC 106, and the server devices 110, 112 for, at least in part, enabling the functions of the management network.

As illustrated, both the VMM 104 and the DC 106 are separate physical devices, within the same or different housing, which can each include a processor and a computer-readable storage medium including executable code that, when executed by the processor, cause the processor to perform the functions of the VMM 104 and the DC 106. In an alternative configuration, the VMM 104 and DC 106 are applications executing on the same physical device and, thereby, sharing physical processor and storage resources.

As further illustrated, the server device 110 has a client 116, a storage access virtual machine (SAVM) 118, and one or more guest virtual machines (VMs) 120 operating thereon. Similarly, the server device 112 has a client 126, a SAVM 128, and one or more guest VMs 130 operating thereon. The server devices 110, 112 can communicate over a file system local area network 122 and a failover cluster network 124. In this example, both networks 122 and 124 are software-defined such that they are virtualized or, in other words, virtual local area networks (vLANs). The server devices 110, 112 also provide for the shared file system 114 that stores at least a client data store (DS) 132, a client data store 134, and a state information (SI) data store (DS) 136. The client data stores 132 and 134 are also referred to herein simply as DSs 132 and 134. The state information data store is also referred to herein simply as the DS 136.

In this example, the server devices 110, 112 are "hypervisors hosts" meaning that the server devices 110, 112 each include a "hypervisor" that can be implemented as a server application, such as HYPER-V®, a registered trademark of Microsoft Corporation, to create and operate virtual machines. As illustrated, the client 116 operating on the server device 110 is a hypervisor that can create and operate one or more guest VMs 120 and the SAVM 118. The client 126 operating on the server device 112 is a hypervisor that can create and operate one or more guest VMs 130 and the SAVM 128. There may be many (e.g., hundreds) of guest VMs 120 or 130 operating, respectively, by the clients 116 and 126. In another example, the clients 116 and 126 can by implemented as a server application, such as SQL SERVER®, a registered trademark of Microsoft Corporation, that creates and operates virtual databases.

In this example, the server devices 110, 112 are also "hyperconverged" meaning that, besides including the hypervisors 116 and 126, they each, at least, include virtualized or software-defined storage and storage access. The server devices 110, 112 may also provide for one or more other features as hyperconverged devices including, but not limited to, compute, storage network switching, cloud gateway, caching, Wide Area Network optimization, replication, real-time deduplication, etc. For instance, the server devices 110, 112 each include physical storage such as a storage disk for storing data. The storage of the data is virtualized on top of the physical storage of both server devices 110, 112 into the shared file system 114 containing multiple data stores accessible using the SAVMs 118 and 128.

Each data store, which may contain multiple file system instances also referred to herein simply as VM files, is presented as both a virtual file system structure or virtual container on a given physical storage and as a virtual file share accessible by both server devices 110, 112 using a suitable storage access protocol (e.g., SMB). Thus, a file share may be considered as being mapped to a data store. Moreover, since VM files may be distributed across the physical storage of multiple server devices 110, 112, the shared file system 114 is also referred to herein as a distributed file system.

In an implementation, the data store may be implemented using a deduplicated object store that stores objects that make up the user files accessible via a storage access protocol. Each object can be identified by a signature that is a cryptographic hash digest of the object's contents. The file system instance may be a hierarchical arrangement of the objects (e.g., a Merkle tree).

In one example, the physical storage of both servers 110, 112 each store a replica of the data contained in the shared file system 114. For instance, replicas of the structure and contents of the DS 132, the DS 134, and the DS 136 are stored within the physical storage of the server device 110 and the physical storage of the server device 112. In this example, the DS 132 stores "user" data for and accessible by the client 116 using a first storage address, which can be an Internet Protocol (IP) address. The SAVM 118 manages access by the client 116 to the DS 132 through an exchange of storage access protocol messaging over the file system vLAN 122. Similarly, the DS 134 stores "user" data for and accessible by the client 126 using a second storage address. The SAVM 128 manages access by the client 126 to the DS 134 through an exchange of storage access protocol messaging over the file system vLAN 122.

For some scenarios, the clients 116 and 126 need a heightened level of reliability and availability for some user data as compared to other user data, which is referred to herein as "continuous availability" of file shares in a shared file system configuration. For example, the clients 116 and 126 store, in the respective DSs 132 and 134, virtual machine data or data used to maintain the guest VMs 120 and 130. Data stores containing virtual machine data are also referred to herein as virtual machine data stores (VMDSs). If the clients 116 and 126 cannot access their respective VMDSs 132 and 134 within an established or specified time period, this can lead to one or more virtual machines stopping or crashing because, for instance, they can no longer read from or write to their storage.

To enable the continuous availability of data stores of the shared file system, server devices 110, 112 are configured into a failover cluster (failover domain) configuration. The failover cluster provides for data stores to be associated with a continuous availability property. Accordingly, if a SAVM fails that manages access to a data store associated with a continuous availability property, management (also referred to herein as ownership) of the data store is "transparently" transferred or "failed over" to another SAVM with the specified time period, such that that the client is unaware that a different SAVM is providing access to the data store. The failover cluster illustrated in FIG. 1 includes two server devices 110, 112. However, the failover cluster can be configured with additional server devices. Moreover, the data center 100 can, in another example, be configured into a "federation" that includes multiple failover clusters, each having two or more server devices.

In the illustrated example, if the SAVM 128 fails, e.g., where operation of at least a part of the SAVM 128 itself goes offline (for instance due to server maintenance) or where the SAVM 128 is otherwise unable to access its physical storage (for instance because the physical storage fails), the server device 110 can transfer management of the DS 134 to the SAVM 118, when the DS 134 is associated with a continuously available property. Messaging and/or signaling can be exchanged over the failover cluster vLAN 124 between the SAVM 118 and the SAVM 128 (for instance between respective failover control modules, as described later) to detect failure of the SAVM 128. Messaging and/or signaling can be exchanged (for instance between a failover control module and a storage access module within the SAVM 118, as described later) to transfer management of the DS 134 to the SAVM 118.

Furthermore, in this example, the storage access protocol used is a "stateful" protocol, meaning that state information about an ongoing session to access a data store is maintained by part of the protocol. For example, the SAVM 118 stores state information for each ongoing session between the SAVM 118 and the client 116 in one or more state information files within the DS 136. In accordance with the present disclosure, these state information files are associated with the storage address for the DS 132. Similarly, the SAVM 128 stores state information for each ongoing session between the SAVM 128 and the client 126 in one or more state information files within the DS 136. These state information files are associated with the storage address for the DS 134. State information in the state information files includes any information needed to restore storage access sessions upon disruption. A storage access session (or simply session) is a communication session between a SAVM and a client established to enable the client to access data from a data store stored on the shared file system. A storage access session is established, at least in part, by the SAVM and client exchanging messaging using a suitable storage access protocol.

When the storage access protocol is a stateful protocol, in order to implement CA of the data stores when a SAVM fails, both management of the data store and access to the state information for all ongoing sessions of the failed SAVM must be timely transferred to an operational SAVM. The disclosed examples illustrate methods and systems for data store and state information handover, in accordance with the present teachings. In these examples, the state information handover is coordinated with the data store failover methods and systems, as further described by reference to the remaining drawings.

Figure 2:
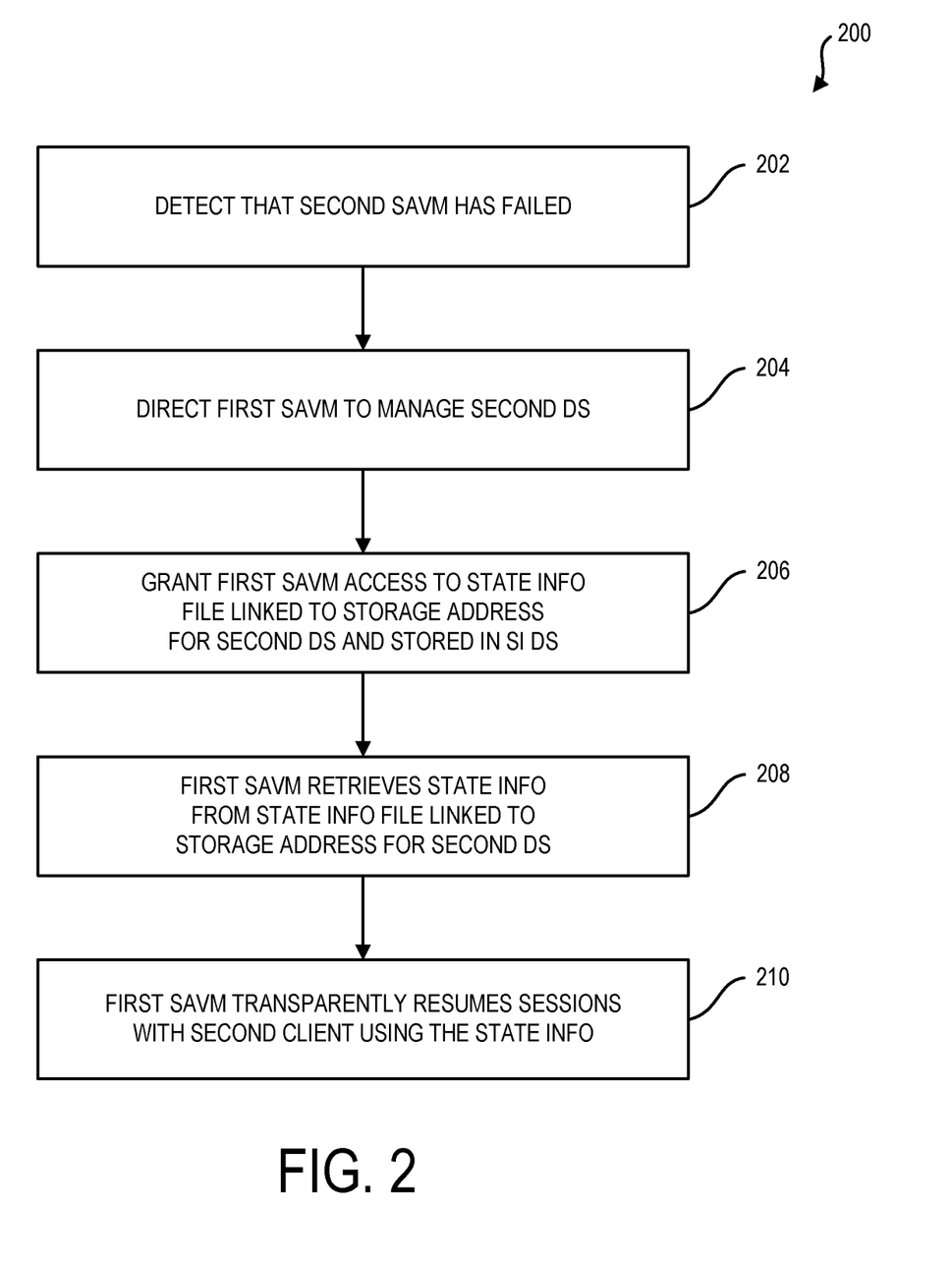
FIG. 2 depicts a flow diagram of a method for data store and state information handover between the server devices depicted in FIG. 1, according to one or more examples of the present disclosure.

FIG. 2 depicts a flow diagram of a method 200 for data store and state information handover between the server devices 110, 112 depicted in FIG. 1, according to one or more examples of the present disclosure. The method 200 can be performed by the server device 110 and/or the server device 112. However, for illustrative purposes, method 200 is described as being performed by the server device 110. Moreover, in FIG. 2, the SAVM 118 is referred to as the first SAVM; the SAVM 128 is referred to as the second SAVM; the DS 134 is referred to as the second DS; and the client 126 is referred to as the second client.

The server device 110, for example the SAVM 118 of the server device 110, can detect (202) that the SAVM 128 of the server device 112 has failed. The detection can be done using any suitable messaging between the server device 110 and the server device 112, for instance over the failover cluster vLAN 124. For example, the SAVMs of each server device in the failover cluster, in this case the SAVMs 118, 128, respectively, of the server devices 110, 112, can form a ring network that provides a communication pathway for the SAVMs 118, 128 to notify or "ping" each other to indicate that they are operational to perform their duties. Accordingly, the SAVM 118 can detect that the SAVM 128 has failed when it fails to be pinged by the SAVM 128.

In the example of a failover cluster having more than two server devices, a more complex algorithm can be used to detect the failure of a SAVM in the ring. For instance, each SAVM in the ring is assigned a sequence. Then if one of the SAVMs in the ring fails, the next surviving SAVM in the sequence picks up the responsibilities of the failed SAVM.

Upon the SAVM 118 detecting (202) the failure, the server device 110 transfers or hands over the storage access responsibilities of the SAVM 128 to the SAVM 118. This handover includes the server device 110 directing (204) the SAVM 118 to manage the DS 134 and granting (206) the SAVM 118 access to a state information file linked to the storage address for the DS 134 and stored in the DS 136. The state information file linked to the storage address for DS 134 contains state information needed to restore or resume sessions between the client 126 and the SAVM 128, for instance over the file system vLAN 122, at the time the SAVM failed.

In accordance with examples of the present disclosure, the transfer or handover or failover of the management of the DS 134 from the SAVM 128 to the SAVM 118 and granting the SAVM 118 access to the associated state information file is linked by the storage address of the DS 134. For a particular example, the state information file is accessible using a storage path that includes the storage address for the DS 134. In another example, the storage address for the DS 134 is used to directly or indirectly point to a storage location indicator for the state information file. In another example, a same entity, module, function, or intelligence coordinates or at least partially performs the failover process and the access granting process using the storage address for the DS 134. In a particular example, the entity, module, function, or intelligence is operated using an application that, at least in part, is used to establish the structure of the shared file system 114. In yet another example, a storage configuration file for SAVM 118, used to indicate which DS(s) and state information files the SAVM 118 owns is updated with the storage address for the DS 134 and a storage location indicator for the state information file linked to the storage address for the DS 134. The location indicator for the state information file can include or be otherwise associated with the storage address for the DS 134.

The SAVM 118 can now retrieve (208) the state information for the state information file linked to the DS 134 and transparently resume (210) sessions with the client 126 using the state information. "Transparently" resuming a session means that the session is resumed or restored within an allotted time, for instance within sixty seconds or less, without the client device 126 being aware that the different SAVM 118 other than the SAVM 128 local to the server device 112 is providing access to the DS 134. Accordingly, the SAVM 118 manages the DS 134 on behalf of the SAVM 128. In one example, the SAVM 118 receives, over the file system vLAN 122, a session connection request from the client 126 identifying a local address for failover cluster. The local address resolves to the storage address linked to the DS 134 when sent by the client 126 and resolves to the storage address linked to the DS 132 when sent by the client 116. The SAVM 118 then responds to the session connection request, over the file system vLAN, to resume the session on behalf of the SAVM 128, which would if operational respond to the connection request from the client 126.

Figure 3:
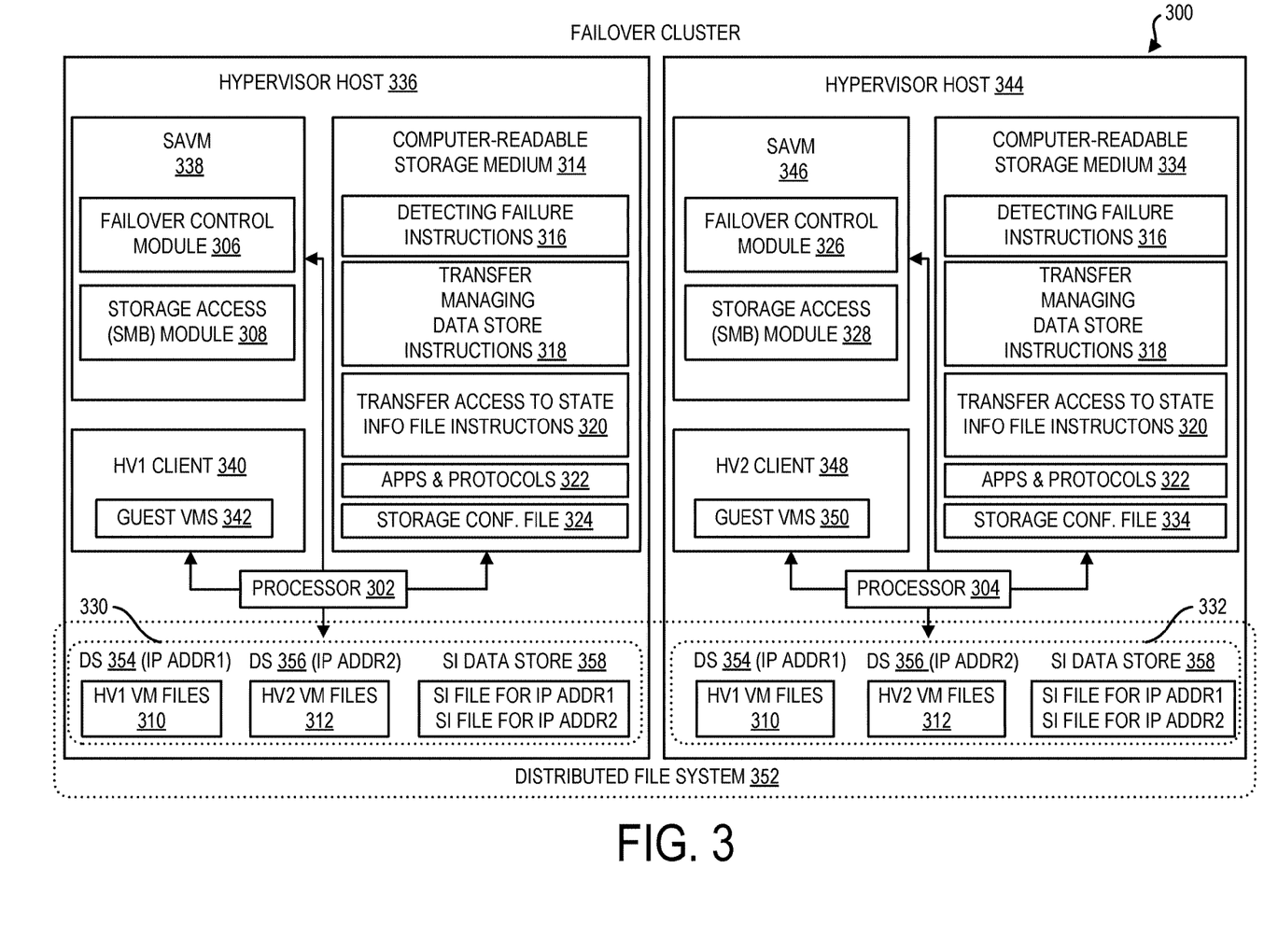
FIG. 3 depicts a failover cluster that includes a plurality of hypervisor hosts that provides for data store and state information handover, according to one or more examples of the present disclosure.

FIG. 3 depicts a failover cluster 300 that includes hypervisor hosts 336 and 344 including modules therein that provide for data store and state information handover, according to one or more examples of the present disclosure. The example failover cluster 300 operates in a WINDOWS®, a registered trademark of Microsoft Corporation, environment that supports versions, implementations, or dialects of the SMB protocol to provide CA and transparent failover. In one example, the version of SMB protocol is 3.0 or higher. An implementation or dialect of the SMB protocol has at least some of the functionality of the SMB protocol and can be used to communicate with a SMB client. An example implementation is SAMBA®, a registered trademark of Software Freedom Conservancy, Inc. SMB, as used herein, refers interchangeably to a version, implementation, or a dialect of SMB protocol. Moreover, a version, implementation, or dialect of SMB also refers, interchangeably, to a modified version, implementation, or dialect of SMB, which further includes added code or logic to perform functions according to the present disclosure.

In a particular example, an administrator can use a VMM running WINDOWS® to configure the hypervisor hosts 336, 344 into the failover cluster 300. In a further example, the hypervisor hosts 336, 344 are each implemented using a SIMPLIVITY®, a registered trademark of Hewlett Packard Enterprise Development LP, device that runs a version of OMNISTACK® software, a registered trademark of Hewlett Packard Enterprise Development LP, as a file system application, which is used to provision a distributed file system structure 352 and some modules of the hypervisor hosts 336, 344. Any suitable alternative file system application can be used to provide similar functionality as the OMNISTACK® software according to the present disclosure.

As used herein a "module" represents particular functionality that is realized by a processor executing instructions and/or protocols stored in a computer-readable storage medium. The VMM is further used to map the failover cluster 300 to a failover domain presented by the distributed file system 352 so that WINDOWS® virtual file shares can be mapped to corresponding data stores in the distributed file system 352. For example, when the hypervisor host 336 is joined to the failover cluster 300, a WINDOWS® file share is created and mapped to a DS 354 using an IP address IP ADDR1, to enable a hypervisor1 (HV1) client 340 to access the DS 354 using a storage access protocol. Similarly, when the hypervisor host 344 is joined to the failover cluster 300, a WINDOWS® file share is created and mapped to a DS 356 using an IP address IP ADDR2, to enable a hypervisor2 (HV2) client 348 to access the DS 356 using the storage access protocol.

The hypervisor host 336 is a physical device that includes a processor 302, a computer readable storage medium 314, and a portion 330 of the distributed file server 352 having stored thereon the DS 354 accessible by IP ADDR1, the DS 356 accessible by IP ADDR2, and a state information (SI) data store (DS) 358. The DS 354 includes VM1 files 310 containing data to operate guest VMs 342 (referred to herein as HV1 VM files 310). The DS 356 includes VM2 files 312 containing data to operate VMs 350 (referred to herein as HV2 VM files 312). In one example, when each VM 342 or 350 is created and registered with the VMM, a corresponding HV1 VM file is, respectively, created on the DS 354 or 356. For example, where there are 100 guest VMs being operated by a hypervisor client, 100 corresponding VM files would be created on the data store. The DS 358 includes a storage information file for or linked to IP ADDR1 and a storage information file for or linked to IP ADDR2.

The computer-readable storage medium 314 includes applications (apps) and protocols 322 that, when executed by the processor 302, cause the processor 302 to operate a SAVM 338, including a failover control module 306 and storage access module 308, and to operate the HV1 client 340 including the guest VMs 342. In an example, the apps and protocols 322 includes HYPER-V® that, when executed by the processor 302, causes the processor 302 to operate the HV1 client 340 to create and operate the guest VMs 342.

In this example, the apps and protocols 322 further includes the OMNISTACK® software that, when executed by the processor 302, causes the processor 302 to operate the failover control module 306 and some functionality of the storage access module 308. For instance the processor 302 executing the OMNISTACK® software can operate the failover control module 306 to, upon the hypervisor host 336 being joined to the failover cluster 300, determine whether the DS 358 exists. If not, the failover control module 306 creates the DS 358, registers a file share with the VMM that maps to the DS 358, and creates the SI file for IP ADDR1 within the DS 358. If the DS 358 already exists, the failover control module 306 simply creates the SI file for IP ADDR1 within the DS 358. In an example, the DS 358 is "hidden" from the HV1 client 340 and the HV2 client 348 meaning that the HV1 client 340 and the HV2 client 348, at the least, are not provided access to the DS 358 and in a particular example do not even have visibility to existence of the DS 358. Moreover, the DS 358 can have a trivial database format. The processor 302 executing the OMNISTACK® software can further operate the failover control module 306 to write to a storage configuration file 324 for the storage access module 308, which can be stored on the computable-readable storage medium 314, and notify the storage access module 308 to upload the storage configuration file 324 to set the data store(s) and corresponding SI files the storage access module 308 manages at any given time.

Further to this example, the apps and protocols 322 includes a version or dialect of the SMB protocol that, when executed by the processor 302, causes the processor 302 to operate the storage access module 308 to function in a SMB server role to provide access to the file shares that map to the data stores 354 and 356. The version or dialect of the SMB protocol, when executed by the processor 302, further causes the processor 302 to operate the HV1 client 340 to function in a SMB client role to request access to the file share that maps to the DS 354. In this example, to access one or more of the HV1 files 310 in the DS 354, the HV1 client 340 operates under control of the version or dialect of the SMB protocol to send a session connection request that maps to the IP ADDR1. For instance, the HV1 client 340 operates to send a session connection request that identifies or contains a local address that maps to the IP ADDR1.

Similarly, the hypervisor host 344 is a physical device that includes a processor 304, a computer readable storage medium 334, and a portion 332 of the distributed file server 352 having stored thereon the DS 354 accessible by IP ADDR1, the DS 356 accessible by IP ADDR1, and the DS 358. The computer-readable storage medium 334 includes the applications (apps) and protocols 322 that, when executed by the processor 304, cause the processor 304 to operate a SAVM 346, including a failover control module 326 and storage access module 328, and to operate the HV2 client 348 including the guest VMs 350. In an example, the apps and protocols 322 includes HYPER-V® that, when executed by the processor 304, causes the processor 304 to operate the HV2 client 348 to create and operate the guest VMs 350.

In this example, the apps and protocols 322 further includes the OMNISTACK® software that, when executed by the processor 304, causes the processor 304 to operate the failover control module 326 and some functionality of the storage access module 328. For instance, the processor 304 executing the OMNISTACK® software can operate the failover control module 326 to, upon the hypervisor host 344 being joined to the failover cluster 300, determine whether the DS 358 exists. If not, the failover control module 326 creates the DS 358, registers a file share with the VMM that maps to the DS 136, and creates the SI file for IP ADDR2 within the DS 358. If the DS 358 already exists, the failover control module 326 simply creates the SI file for IP ADDR2 within the DS 358. The processor 304 executing the OMNISTACK® software can further operate the failover control module 326 to write to a storage configuration file 334 for the storage access module 328, which can be stored on the computable-readable storage medium 334, and notify the storage access module 328 to upload the storage configuration file 334 to set the data store(s) and corresponding SI files the storage access module 328 manages at any given time.

Further to this example, the apps and protocols 322 includes a version or dialect of the SMB protocol that, when executed by the processor 304, causes the processor 304 to operate the storage access module 328 to function in a SMB server role to provide access to the file shares that map to the data stores 354 and 356. The version or dialect of the SMB protocol, when executed by the processor 304, further causes the processor 304 to operate the HV2 client 348 to function in a SMB client role to request access to the file share that maps to the DS 356. In this example, to access one or more of the HV2 files 312 in the DS 356, the HV2 client 348 operates under control of the version or dialect of the SMB protocol to send a session connection request that maps to the IP ADDR2. For instance, the HV2 client 348 operates to send a session connection request that identifies or contains a local address that maps to the IP ADDR2.

In accordance with an example of the present disclosure, the computer-readable storage mediums 314 and 334 further include executable instructions that, when executed by the processor 302 or 304, cause the processor 302 or 304 to, respectively, operate the SAVM 338 or the SAVM 346 to perform a method for data store and state information handover between the hypervisor hosts 336 and 344. Example executable instructions include detecting failure instructions 316, transfer managing data store instructions 318, and transfer access to state information instructions 320. The executable instructions 316, 318, and 320 can cause the processor 302 or 304 to operate the SAVM 338 or the SAVM 346 to perform the method 200 of FIG. 2 or a method 400 of FIG. 4. Moreover, in an example, the executable instructions 316, 318, and 320 can be incorporated in the OMNISTACK® software or the version or dialect of the SMB protocol.

Figure 4:
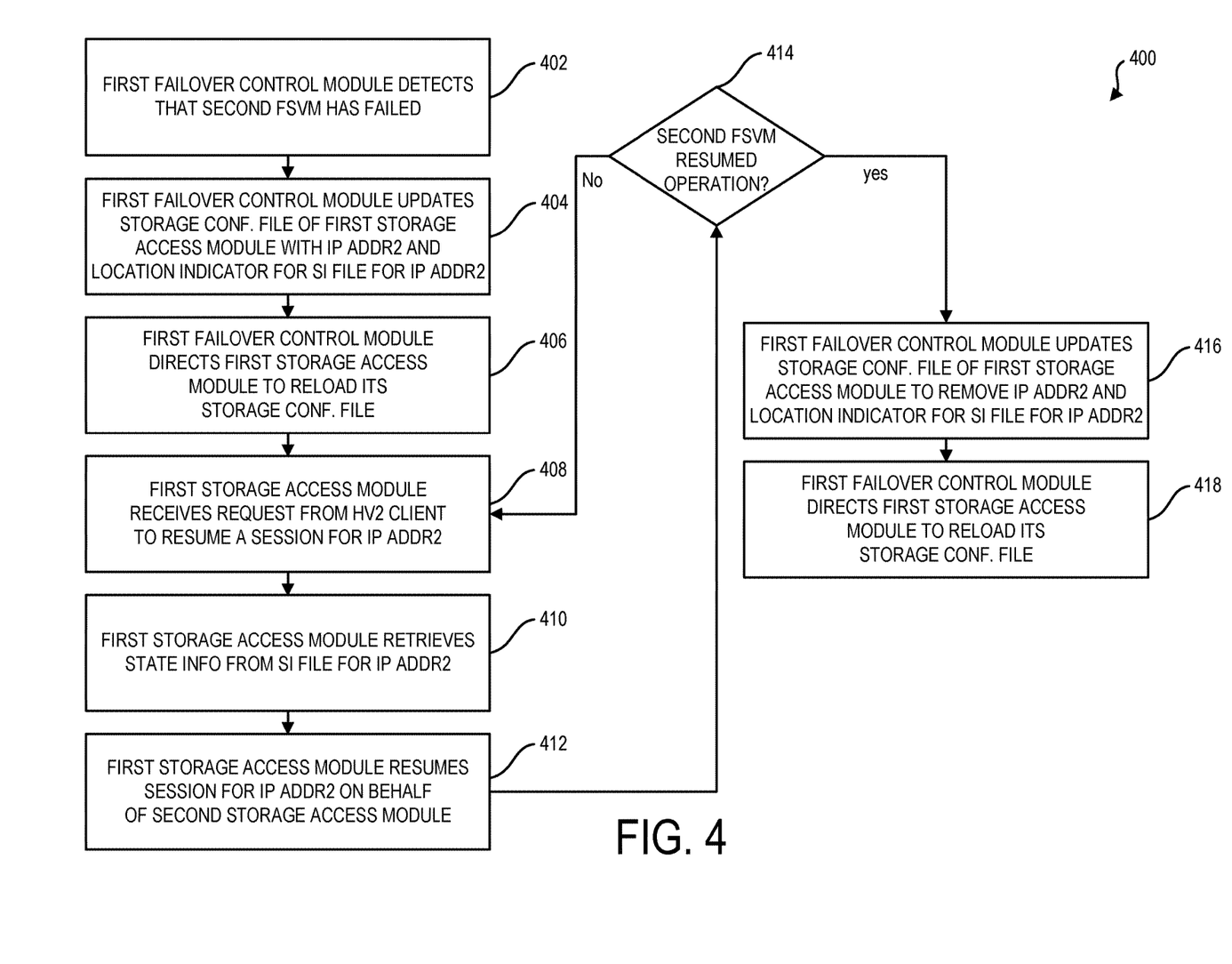
FIG. 4 depicts a flow diagram of a method for data store and state information handover between the hypervisor hosts depicted in FIGS. 1 and 3, according to one or more examples of the present disclosure.

FIG. 4 depicts a flow diagram of the method 400 for data store and state information handover between the hypervisor hosts, such as hypervisor hosts, 336 and 344 depicted in FIG. 3, according to one or more examples of the present disclosure. For illustrative purposes, the method 400 is described as being performed by the SAVM 338 of the hypervisor host 336. Moreover, in FIG. 4, the failover control module 306 is referred to as the first failover control module; the storage access module 308 is referred to as the first storage access module; the storage access module 328 is referred to as the second storage access module; and the SAVM 346 is referred to as the second SAVM.

Performing blocks 402, 404, and 406 (which can, respectively, correlate to instructions 316, 318, and 320 and/or blocks 202, 204, and 206 of method 200), the failover control module 306 functions to coordinate both transparent failover of the DS 356 and transfer of ownership of the corresponding SI file for IP ADDR2. The failover control module 306 coordinating both of these functions can create a high likelihood that only one storage access module owns and manages a storage address and corresponding SI file at any given time and enables a seamless and timely transfer of ownership of the state information use to resume sessions with the HV2 client 348.

In particular, the failover control module 306 detects (402), e.g., through a ring network and associated algorithm, that the SAVM 128 has failed. For example, the failover control module 306 monitors for pings from the failover control module 326 to determine whether or not the SAVM is operational. To responsively transfer management of the DS 356 to the storage access module 308, the failover control module 306 updates (404) the storage configuration file 324 with IP ADDR2 and a location indicator for the SI file for IP ADDR2 and directs (406) the storage access module 308 to reload the configuration file 324.

Figure 5:
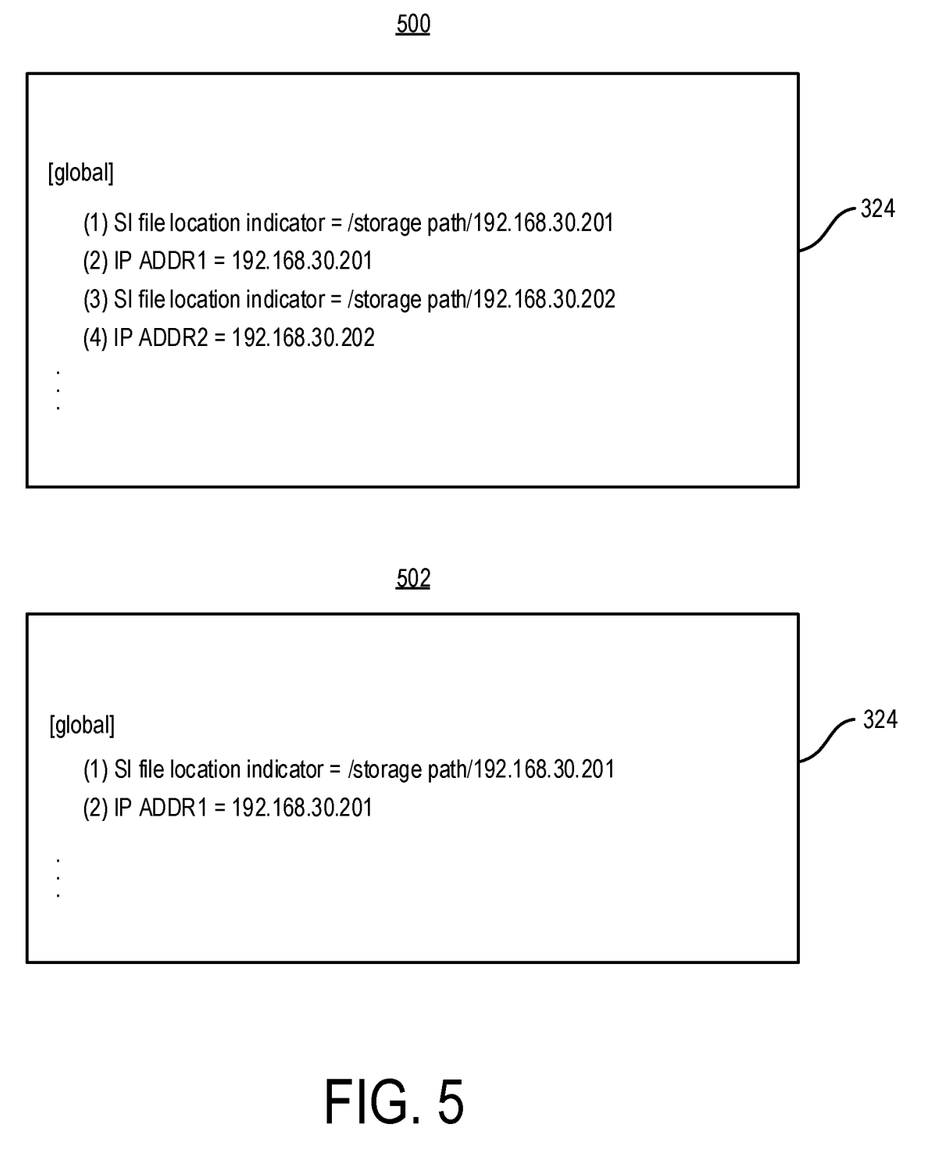
FIG. 5 depicts a storage configuration file being updated during data store and state information handover between the hypervisor hosts depicted in FIGS. 1 and 3, according to one or more examples of the present disclosure.

Referring now to FIG. 5 with continued reference to FIG. 4, FIG. 5 depicts the storage configuration file 324 being updated during data store and state information handover between the hypervisor hosts 336 and 344 depicted in FIGS. 1 and 3, according to one or more examples of the present disclosure. A snapshot 500 of the storage configuration file 324 illustrates four example entries or "directives" labeled (1), (2), (3), and (4), for ease of illustration, entered into the storage configuration file 324 by the failover control module 306. In this example, IP ADDR1 is 192.168.30.201, and IP ADDR2 is 192.168.30.202. Entry (1) corresponds to a location indicator for IP ADDR1, and entry (2) corresponds to the IP ADDR1. Entry (3) corresponds to a location indicator for IP ADDR2, and entry (4) corresponds to the IP ADDR2. Further in this example, the location indicators of entries (1) and (3) correspond, respectively, to a storage path that includes the IP ADDR1 and a storage path that includes the IP ADDR2. When the storage access module 308 uploads the storage configuration file 324 it owns both the IP ADDR1 and its associated SI file and IP ADDR2 and its associated SI file and will respond to session connection requests from the HV1 client 340 to access the DS 354 and from the HV2 client 348 to access the DS 356 and to maintain state information to restore sessions with both clients 340 and 348.

The method can then proceed to block 408, where the storage access model 308 functions to receive (408) a session connection request from HV2 client 348 to resume a session for IP ADDR2, retrieve (410) state information from state information file associated with IP ADDR2, and resume (412) a session for the IP ADDR2 on behalf of the storage access module 328. For example, a domain name system (DNS) naming configuration can be used to facilitate the storage access module 308 transparently responding to session connection requests from the HV2 client 348 on behalf of the storage access module 328. For instance, a local address can be assigned to the failover cluster 300. In a particular example, BosClus-smb.fib.local is a Universal Naming Convention (UNC) name used as a local address for share access to the distributed file system 352.

DNS can be configured as round robin for BosClus-smb.fib.local such that 192.168.20.201 and 192.168.20.202 both resolve to BosClus-smb.fib.local. Since the VMM and the DC are only on the management network, BosClus-smb.fib.local will resolve to one of the above two IP addresses. Thus, if one SAVM is down, DNS round robin will take care of resolving it to the other SAVM. On each hypervisor host 336 and 344, etc\hosts entries for BosClus-smb and BosClus-smb.fib.local can be added to resolve to the local storage IP. On HV1 client 340, BosClus-smb.fib.local will point to 192.168.30.201. On HV2 client 348, BosClus-smb.fib.local will point to 192.168.30.202. Thus, when the SAVM 346 fails for example, since 192.168.30.202 is now owned by storage access module 308, an attempt by HV2 client 348 to access BosClus-smb.fib.local, will resolve to 192.168.30.202, which will be responded to by storage access module 308.

The failover control module 306 continues to monitor (414) for pings from the failover control module 326 to determine whether or not the SAVM 346 is operational. If the SAVM 346 is still offline, the method 400 returns to block 408 when the failover control module 306 receives a session connection request from the HV2 client 348. Otherwise, when the failover control module 306 detects that the SAVM 346 has resumed operation, the failover control module 306 directs the storage access module 308 to stop managing access to IP ADDR2 and prevents the storage access module 308 from accessing the SI file associated with IP ADDR2. In the illustrated method 400, the failover control module 306 does this by updating (416) the storage configuration file 324 to remove entry (3) that corresponds to the location indicator for IP ADDR2 and the entry (4) that corresponds to the IP ADDR2. A snapshot 502 of the storage configuration file 324 shows only the entry (1) that corresponds to the location indicator for IP ADDR1 and the entry (2) that corresponds to the IP ADDR1.

The failover control module 306 then directs (418) the storage access module 308 to reload the storage configuration file 324. This results in the storage configuration file 324 only managing the DS 354 and its associated SI file, so that the failover control module 326 can return the management of the DS 356 and its associated SI file back to the storage access module 328.

For simplicity and illustrative purposes, the present disclosure is described by referring mainly to examples thereof. In the above description, numerous specific details are set forth in order to provide a thorough understanding of the present disclosure. It will be readily apparent, however, that the present disclosure may be practiced without limitation to these specific details. For instance, the examples illustrate the present disclosure being practiced where the server devices are hypervisors. However, the present disclosure may be practiced by other types of server devices in a failover cluster configuration, where each server device includes a client that accesses a data store using a storage access virtual machine that resides on the server device with the client. Moreover, the hypervisor hosts depicted in the drawings show an example number of representative elements. However, the hypervisor hosts may include more or fewer elements than is depicted, and may depict only a portion of a larger computing device intended for inclusion within a data center. Additionally, some of the elements depicted may be removed and/or modified without departing from a scope of the examples described. In other instances, some methods and structures have not been described in detail so as not to unnecessarily obscure the present disclosure. As used herein, the term "includes" means includes but not limited to, and the term "including" means including but not limited to. Also, the term "has" means has but not limited to, and the term "having" means having but not limited to. Herein, the term "about" when applied to a value generally means within the tolerance range of the equipment used to produce the value, or in some examples, means plus or minus 10%, or plus or minus 5%, or plus or minus 1%, unless otherwise expressly specified.

What is claimed is:

1. A method for data store and state information handover between a plurality of server devices, the method comprising:
   detecting, by a second server device of the plurality of server devices, that a first storage access virtual machine operating on a first server device of the plurality of server devices has failed, the first storage access virtual machine managing access to a first data store of a shared file system by a first client operating on the first server device using a first storage address;
   directing a second storage access virtual machine operating on the second server device to manage access to the first data store, the second storage access virtual machine also managing access to a second data store of the shared file system by a second client operating on the second server device using a second storage address; and
   granting the second storage access virtual machine access to a first state information file stored within the shared file system, the first state information file being associated with the first storage address.

2. The method of claim 1, further comprising:
   retrieving, via the second storage access virtual machine, state information from the first state information file; and
   transparently resuming, via the second storage access virtual machine, a session with the first client on behalf of the first storage access virtual machine using the state information to continue access by the first client to the first data store.

3. The method of claim 2, wherein transparently resuming the session with the first client on behalf of the first storage access machine comprises:
   receiving, from the first client or the second client a session connection request identifying a local address for the plurality of server devices, wherein the local address is mapped to the first storage address when the session connection request is sent by the first client, and wherein the local address is mapped to the second storage address when the session connection request is sent by the second client; and
   responding to the session connection request to resume a session on behalf of the first storage access virtual machine.

4. The method of claim 1, wherein the first state information file is accessible using a storage path that includes the first storage address.

5. The method of claim 1, wherein directing the second storage access virtual machine to manage access to the first data store comprises:
   updating a storage configuration file of the second storage access virtual machine with the first storage address; and
   directing the second storage access virtual machine to reload the storage configuration file.

6. The method of claim 5, wherein granting the second storage access virtual machine access to the first state information file comprises:
   updating the storage configuration file of the second storage access virtual machine with a storage location indicator for the first state information file; and
   directing the second storage access virtual machine to reload the storage configuration file.

7. The method of claim 6, further comprising:
   detecting, via the second server device, that the first storage access virtual machine has resumed operation;
   deleting, from the storage configuration file of the second storage access virtual machine, the first storage address and the storage location indicator for the first state information file; and
   directing the second storage access virtual machine to reload the storage configuration file.

8. The method of claim 1, further comprising:
   detecting, via the second server device, that the first storage access virtual machine has resumed operation;

directing, via the second server device, the second storage access virtual machine to stop managing access to the first data store; and
preventing, via the second server device, the second storage access virtual machine from accessing the first state information file.

9. The method of claim 1 further comprising a failover control module of the second server device communicating with a storage access protocol module of the second server device to direct the second storage access virtual machine to manage access to the first data store and to grant the second storage access virtual machine access to the first state information file.

10. A non-transitory computer-readable storage medium including executable instructions that, when executed by a processor of a second server device of a plurality of server devices, cause the processor to:
detect that a first storage access virtual machine operating on a first server device of the plurality of server devices has failed, the first storage access virtual machine managing access to a first virtual machine data store of a shared file system, the first virtual machine data store being accessible using a first storage address which is associated with a first state information file stored within the shared file system;
update a storage configuration file of a second storage access virtual machine of the second server device with the first storage address and a storage location indicator for the first state information file, the storage configuration file also containing a second storage address and associated storage location indicator for a second state information file stored within the shared file system, the second storage address used to manage access to a second virtual machine data store of the shared file system; and
direct the second storage access virtual machine to reload the storage configuration file.

11. The computer-readable storage medium of claim 10, wherein the executable instructions cause the processor to update the storage configuration file with a storage path that includes the first storage address as the storage location indicator for the first state information file.

12. The computer-readable storage medium of claim 10, wherein the executable instructions that, when executed by the processor of the second server device of the plurality of server devices, further cause the processor to:
receive, from a first client operating on the first server device or a second client operating on the second server device, a session connection request identifying a local address for the plurality of server devices, wherein the local address is mapped to the first storage address when the session connection request is sent by the first client, and wherein the local address is mapped to the second storage address when the session connection request is sent by the second client;
retrieve state information from the first state information file; and
responding to the session connection request to resume a session on behalf of the first storage access virtual machine using the state information.

13. The computer-readable storage medium of claim 10, wherein the executable instructions that, when executed by the processor of the second server device of the plurality of server devices, cause the processor to:
detect that the first storage access virtual machine has resumed operation;
delete the first storage address and the storage location indicator for the first state information file from the storage configuration file; and
direct the second storage access virtual machine to reload the storage configuration file.

14. A system for data store and state information handover between a plurality of hypervisor hosts, the system comprising:
a first hypervisor host comprising:
a first processor to operate:
a first hypervisor client; and
a first storage access virtual machine comprising:
a first storage access module that communicates with a plurality of hypervisor clients including the first hypervisor client and a second hypervisor client of a second hypervisor host; and
a first failover control module that communicates with the first storage access module and a second failover control module of the second hypervisor client;
a first portion of a distributed file system that stores a first data store managed by the first storage access module using a first storage address, a second data store managed by a second storage access module of the second hypervisor host using a second storage address, and a state information store containing a first state information file linked to the first storage address and a second state information file linked to the second storage address; and
a first computer-readable storage medium storing executable instructions that, when executed by the first processor, cause the first processor to operate the first failover control module to detect that the second storage access virtual machine has failed and to transfer management of the second data store and access to the second state information file to the first storage access module.

15. The system of claim 14, wherein the state information store is not accessible to any hypervisor client.

16. The system of claim 14, wherein:
the first computer-readable storage medium further storing a storage configuration file for the first storage access module, the storage configuration file containing the first storage address and a storage location indicator for the first state information file; and
the executable instructions that, when executed by the first processor, further cause the first processor to operate the first failover control module to:
update the storage configuration file with the second storage address and a storage location indicator for the second state information file;
direct the first storage access module to reload the storage configuration file; and
transfer management of the second data store and access to the second state information file to the first storage access module.

17. The system of claim 14, wherein the executable instructions that, when executed by the first processor, further cause the first processor to operate the first storage access module to transparently communicate with the second hypervisor client using a storage access protocol and state information contained in the first state information file.

18. The system of claim 17, wherein the storage access protocol is a version or dialect of Server Message Block (SMB) protocol.

19. The system of claim 14, wherein the second hypervisor host comprises:

a second processor to operate:
- the second hypervisor client; and
- the second storage access virtual machine comprising:
  - the second storage access module that communicates with the first hypervisor client and the second hypervisor client; and
  - the second failover control module that communicates with the second storage access module;

a second portion of the distributed file system that stores the first data store, the second data store, and the state information store containing the first state information file and the second state information file; and a second computer-readable storage medium storing executable instructions that, when executed by the second processor, cause the second processor to operate the second failover control module to detect that the first storage access virtual machine has failed and to transfer management of the first data store and access to the first state information file to the second storage access module.

* * * * *